July 29, 1930.  P. S. MORGAN  1,771,809
POWER TRANSMISSION DEVICE
Filed Nov. 4, 1926   3 Sheets-Sheet 1
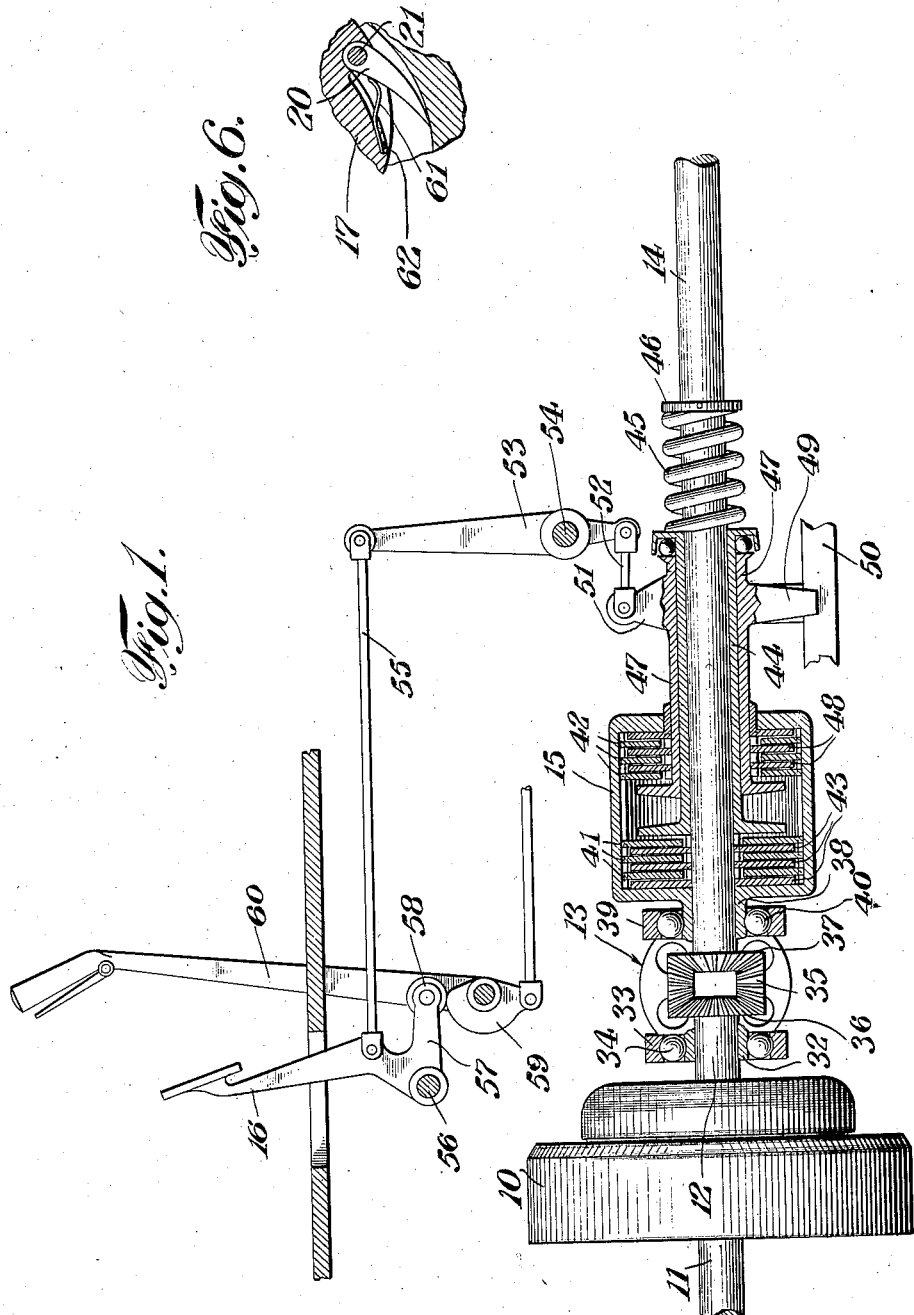
Inventor
Porter S. Morgan.
By his Attorneys
Emery, Booth, Janney & Varney July 29, 1930. P. S. MORGAN 1,771,809
POWER TRANSMISSION DEVICE
Filed Nov. 4, 1926 3 Sheets-Sheet 2
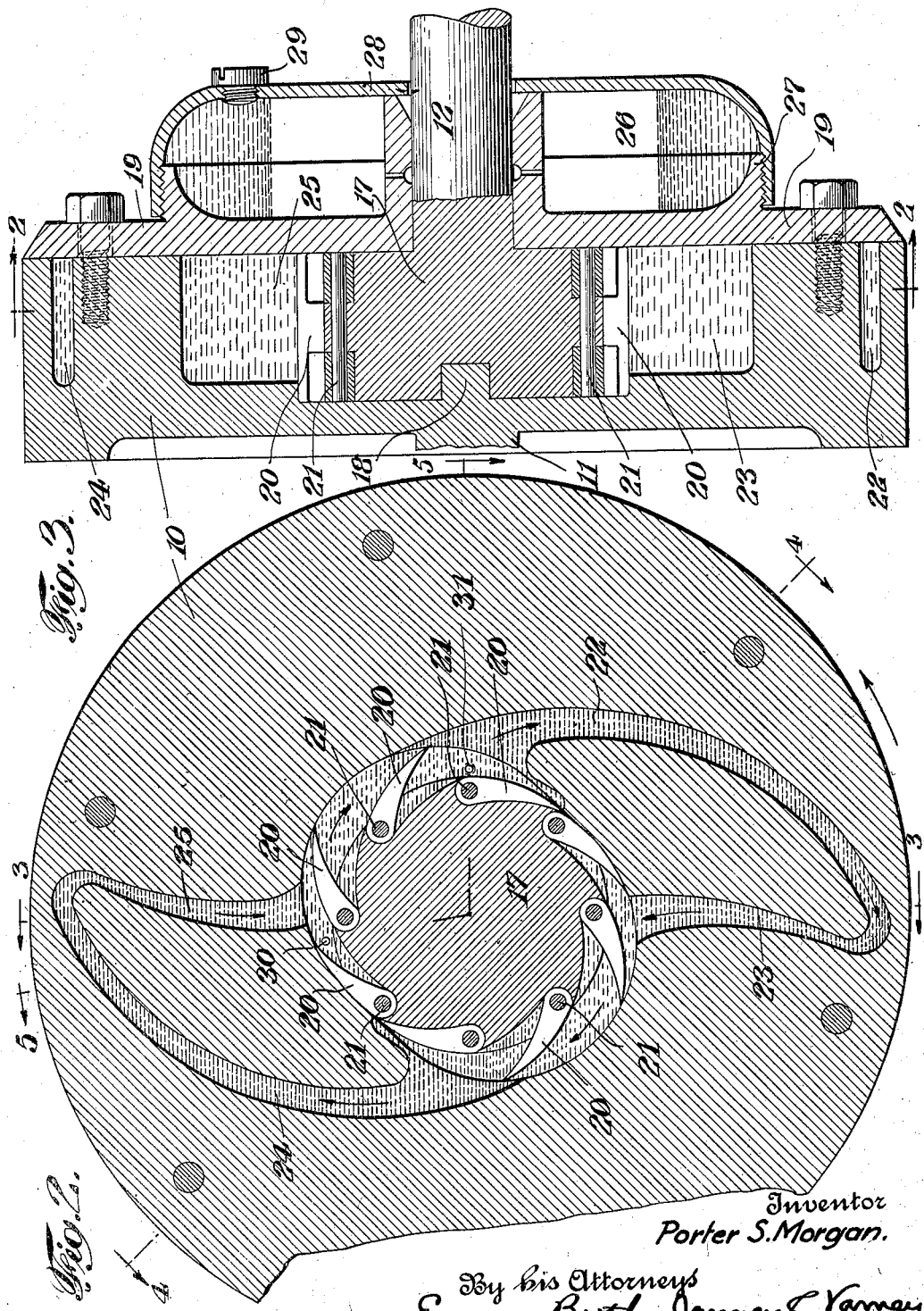
Inventor
Porter S. Morgan.
By his Attorneys
Emery, Booth, Janney & Varney July 29, 1930.   P. S. MORGAN   1,771,809
POWER TRANSMISSION DEVICE
Filed Nov. 4, 1926   3 Sheets-Sheet 3

Inventor
Porter S. Morgan.
By his Attorneys
Emery, Booth, Janney & Varney

Patented July 29, 1930

1,771,809

UNITED STATES PATENT OFFICE

PORTER S. MORGAN, OF DARIEN, CONNECTICUT, ASSIGNOR TO JOHN B. RUSSELL, OF NEW YORK, N. Y.

POWER-TRANSMISSION DEVICE

Application filed November 4, 1926. Serial No. 146,075.

This invention purposes the improvement of power transmission devices. The accompanying drawings exhibit, as one illustrative embodiment of the invention, a hydraulic power transmission unit particularly applicable to automobiles and other vehicles.

Figure 5:
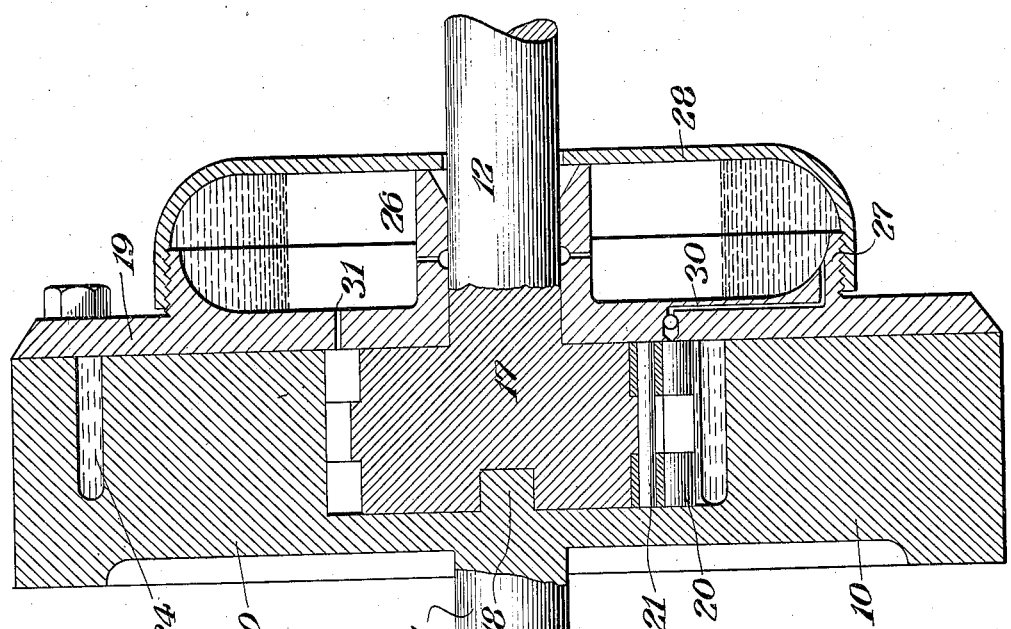
Figure 4:
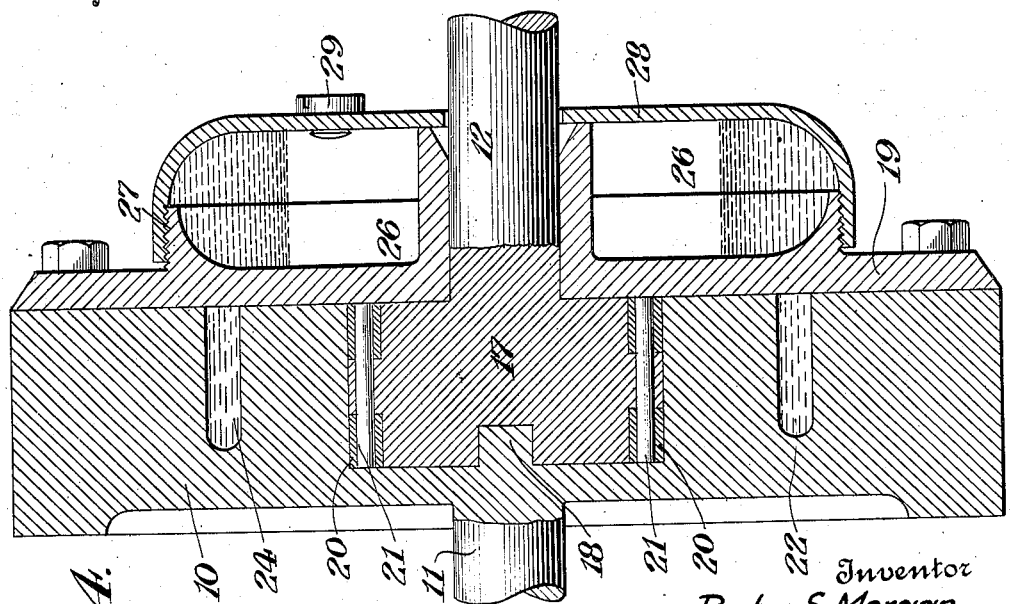

In the drawings of this embodiment, Figure 1 is a general assembly showing the transmission unit, clutch, operating foot lever, and associated parts in train; Figure 2 is a vertical cross section of the transmission unit proper, taken on the line 2—2 of Figure 3; Figure 3 is a section taken on the line 3—3 of Figure 2; Figure 4 is a section taken on the line 4—4 of Figure 2; Figure 5 is a section taken on the line 5—5 of Figure 2 and Figure 6 is a detail of certain parts.

Referring particularly to Figure 1, the main body or shell of the transmisison unit is designated by the numeral 10 and is fixed to the driving shaft 11.

Connected to apparatus contained within the transmission shell 10 (said apparatus to be hereinafter described) is the driven shaft 12 which, through a differential mechanism 13 drives the jack shaft 14 which, in turn, propels the rear wheels of the vehicle.

Associated with the parts previously referred to is a clutch mechanism enclosed within a casing 15 and connected by a train of levers and rods to a foot pedal 16, as more fully described hereinafter.

Referring to Figures 2, 3, 4 and 5, the main body or shell 10 of the transmission unit is shown in the exterior form of a fly wheel centrally chambered to contain a circular rotor 17. The rotor 17 is centrally bored at its inner face to be journaled upon the post 18 integral with the shell 10 and is operatively integral with the shaft 12 which is journaled in the cover 19 of the shell 10.

This cover 19 may be bolted to the shell 10 or otherwise secured therto, to enclose the rotor 17 and hold it in operative position.

As best shown in Figure 2, the rotor 17 is provided at intervals around its periphery with blades 20 pivoted thereto by means of pins 21. Thus upon rotation of the shell 10 relative to the rotor 17, these blades 20 are free to oscillate upon their pivots 21 and to follow the contour of the chamber housing the rotor. If desired, as illustrated in Figure 6, springs 61, secured to the rotor by screws 62, may be provided to urge the blades 20 toward the wall of the chamber at all times.

Said chamber enclosing the rotor 17 is generally oval in shape (for convenience it will be hereinafter referred to as the working chamber) and communicates at four points with the continuous passages 22, 23, 24 and 25.

These continuous passages 22, 23, 24 and 25 are so formed in the shell 10 that passages 23 and 25 lie substantially radially with reference to the main body 10, while the passages 22 and 24 describe a curve the data of which will be hereinafter treated.

The working chamber wherein the rotor 17 is housed and the passages 22, 23, 24 and 25 all connecting with said chamber, are designed to be filled with a suitable fluid such as oil, the supply of which may be replenished from a reservoir 26 formed by the cover 19 provided for this purpose with an exteriorly threaded circular rim 27 whereon is threaded a cap 28 which has a filling opening closed by a plug 29.

The reservoir 26 communicates with the working chamber housing the rotor 17 by means of ducts 30 and 31 adapted respectively to permit the passage of superfluous air from the chamber to the reservoir 26 and the passage of repenishing oil from the reservoir 26 to the working chamber housing the rotor 17.

Referring particularly to Figure 2 for the purpose of following the operation of the structure disclosed, the shell 10 is intended to be so rotated by the driving shaft 11 as to turn counter-clockwise when in the position shown in Figure 2.

As the shell 10 commences its counter-clockwise rotation, the fluid contained in the passages 22, 23, 24, 25 begins to flow in the direction of the arrows, this flow being produced by the blades 20 which at first are stationary relative to the shell 10.

The capacity, shape and position of the passages 22, 23, 24, 25 are so related to the position and fluid-impelling efficiency of the blades 20 that when the rotor 17 is stationary and the shell 10 rotating (regardless of its rate of speed), a given unit of fluid in the passages 22 or 24 will move toward the circumference of the shell 10 in a straight line: i. e. along a stationary radius; while a given unit of fluid in the passages 23 or 25 will move toward the center of the shell 10 in a spiral path relative to a stationary radius.

Thus the body of fluid contained in the passages 22 and 24, moving toward the circumference of the shell 10 in a straight line, does not rotate with the shell 10 about the center of said shell and is not affected by centrifugal force. But the body of fluid contained in the passages 23 and 25, moving toward the center of the shell 10 and simultaneously rotating with the shell 10, is strongly affected by centrifugal force which resists its motion toward the center.

Thus what may be called a force differential is created, the body of fluid in passages 22 and 24 having no tendency to move except as impelled by the blades 20; but the fluid in passages 23 and 25 having a tendency, because of centrifugal force, to move toward the circumference—which tendency increases in proportion to the rotative speed of the shell 10 in accordance with well-known formulæ.

In this manner it will be observed that when the shell 10 is rotated slowly the resistance to the flow of fluid may not be sufficient to turn the rotor 17 (and so drive the vehicle wheels to which said rotor may be connected), but that as the speed of the shell 10 accelerates, resistance to the flow of fluid increases, so that a point will be reached when the rotor 17 is turned (and the vehicle driven).

The driving of a mechanism or vehicle may be generally conceived as a function of two variables: force and resistance. In the inventive embodiment herein described a flexible or automatically responsive transmission mechanism is provided whereby the driving force is automatically translated into vehicle speed in the measure of such force (whether constant or varying) as affected by all the elements of resistance (whether constant or varying) to vehicle motion, such as weight, friction, gradient, etc. For example, with the shell 10 rotating at a given speed, the vehicle might be propelled at 10 M. P. H. over a level surface, but at a lesser rate of speed upward along an incline,—there being a certain gradient whereon the vehicle could not be impelled except by increasing the rotative speed of the shell 10.

In the practical operation of an automobile, for example, when negotiating a hill, it would only be necessary to increase the speed of the motor (and so the speed of the shell 10)—the device herein described obviating the necessity of transmission gears. The speed of the automobile under all conditions would be directly responsive to the speed of the motor, aided or resisted by the contour of the road and other factors of resistance or the opposite.

For supplying fluid to the working chamber and for relieving the working chamber of undesirable air, the reservoir 26 is connected with the working chamber by ducts 30 and 31 which respectively admit oil to and release air from the working chamber in a manner obvious from inspection of the drawings.

To aid in the proper functioning of the blades 20, each of these blades is outwardly urged by a spring shown in detail in Figure 6.

As best shown in Figure 1, the vehicle-propelling connections between the rotor 17 and the vehicle wheels comprises the shaft 12 in train with the differential mechanism 13 and the clutch mechanisms the outer casing of which is designated by the numeral 15.

The shaft 12 is provided with an annular ball race 32 which cooperates with the fixed ball race 33, the balls 34 being located therebetween. Integral with the ring 32 is the body or spider 13 of the differential mechanism, upon which are journaled the bevel pinions 35 which mesh with similar pinions 36, 37 respectively keyed to the shafts 12 and 14. The shaft 14, similarly to the shaft 12, is also provided with an annular ball race 38 which cooperates with the fixed ball race 39, the balls 40 being located therebetween.

The differential spider 13 and the rings 32 and 38 are preferably formed integrally with the clutch-housing 15, so that when the differential spider 13 is stationary the clutch-housing 15 is also stationary, and when the spider 13 rotates the housing 15 rotates with it.

Within and keyed to the clutch-housing 15 are the longitudinally slidable clutch plates 41, 42. Lying between the plates 41 are the plates 43, which are splined to the shaft 14 to rotate therewith but to slide longitudinally relatively thereto.

Surrounding the shaft 14 is the sleeve 44, provided at its left hand end with a flange to compress the plates 41, 43, and at its right hand end with another flange to meet the heavy pressure spring 45, held at its opposite end by the collar 46 pinned to the shaft 14.

Surrounding the sleeve 44 is a similar sleeve 47 similarly provided with a flange to compress the plates 42, 48, the plates 48 being keyed to the sleeve 47 but being free to slide longitudinally thereof. The outermost of said plates 48 is shaped to project through the end of the clutch casing 15 and so to form a bearing for said casing upon the sleeve 47.

Projecting from the under side of the sleeve 47 and integral therewith is the bifurcated member 49 which slidably embraces a guide bar 50, thus permitting the sleeve 47 to slide longitudinally but preventing it from rotating.

Projecting from the upper side of the sleeve 47 and integral therewith is the ear 51 to which is connected the link 52 in turn connected to the lower end of the upright lever 53. The lever 53 is pivoted upon a fixed fulcrum 54, and is connected at its top end by a bar 55 to the foot pedal 16. The foot pedal is pivoted upon a fixed fulcrum 56, and its shorter arm 57 carries at its end a roller 58 which rides upon the cam 59.

The cam 59 is integral with the emergency liable lever 60, and so positioned that when the emergency brake lever is in position to apply the brakes (the position shown in the drawings) the foot lever 16 is in its intermediate or "neutral" position and the vehicle motor free to turn without impelling the vehicle.

For when the foot lever 16 is in the position shown the sleeves 44 and 47, pressed toward the left by the spring 45, are, nevertheless held so that the flange of the sleeve 44 is out of contact with the plates 41, 43, and the flange of the sleeve 47 is out of contact with the plates 42, 48. The driving shaft 11, differential spider 13, and clutch casing 15 then rotate together but do not turn the shaft 14 in either direction.

But when the emergency brake lever 60 is moved to the left to release the brake, foot pedal 16 moves to the right as the roller 58 rides along the face of cam 59 and the spring 45 thrusts the sleeves 44, 47 toward the left, the flange of the sleeve 44 compressing the friction plates 41, 43, thus connecting the shaft 14 with the clutch housing 15, and the shaft turns with and in the same direction as the driving shaft 11.

To effect reversal of direction, the foot lever 16 is pressed forward toward the left until the flange of the sleeve 47 compresses the friction plates 42, 48, thus holding the clutch casing 15 fixed against rotation. In these conditions the differential spider 13 is also held against rotation, with the result that rotation of the driven shaft 12 causes its pinion 36 to turn the pinions 35, the pinion 37 and the shaft 14 being rotated in the opposite direction from the direction of the driven shaft 12.

It is to be understood that the invention may be variously modified and embodied within the scope of the subjoined claims.

I claim as my invention:

1. In a transmission mechanism, a drive shaft, a driven shaft, a transmission medium through which power is transmitted from one shaft to the other, and means whereby when said drive shaft is rotated said transmission medium is caused to move against centrifugal force created thereby, the resistance to such movement tending to cause movement of said driven shaft.

2. In a transmission mechanism, a drive shaft, a driven shaft, a transmission medium through which power is transmitted from one shaft to the other, and means whereby when said drive shaft is rotated units of said transmission medium are caused to move radially outwardly from a center and then inwardly toward said center along a spiral path.

3. In a transmission mechanism, a drive shaft, a driven shaft, a transmission medium through which power is transmitted from one shaft to the other, and means whereby centrifugal force induced by rotation of said drive shaft acting on said transmission medium during a portion of its travel only causes rotation of said driven shaft.

4. In a transmission mechanism, a drive shaft, a driven shaft, a fluid medium through which power is transmitted from one shaft to the other, and means whereby when said drive shaft is rotated said fluid medium is caused to move against centrifugal force created thereby, the resistance to such movement tending to cause movement of said driven shaft.

5. In a transmission mechanism, a drive shaft, a driven shaft, a fluid medium through which power is transmitted from one shaft to the other, and means whereby when said drive shaft is rotated units of said fluid medium are caused to move radially outwardly from a center and then inwardly toward said center along a spiral path.

6. In a transmission mechanism, a drive shaft, a driven shaft, a fluid medium through which power is transmitted from one shaft to the other, and means whereby centrifugal force induced by rotation of said drive shaft acting on said fluid medium during a portion of its travel only causes rotation of said driven shaft.

7. In a transmission mechanism, a drive shaft, a shell secured to said shaft having a chamber therein and a closed passage both ends of which enter said chamber, said chamber and passage being filled with fluid, a driven shaft, and means connected to said driven shaft adapted upon rotation of said shell with respect to said means to cause flow of fluid from said chamber through said passage and back to said chamber.

8. In a transmission mechanism, a drive shaft, a shell secured to said shaft having a chamber therein and a passage both ends of which enter said chamber, said chamber and passage being filled with fluid, a driven shaft, and means connected to said driven shaft adapted upon rotation of said shell with respect to said means to cause flow of fluid from said chamber through said passage and back to said chamber, said passage being constructed and arranged to cause flow of fluid outwardly from said chamber in a straight line and inwardly to said chamber along an extended spiral path with reference to a fixed plane.

9. In a transmission mechanism, a drive shaft, a shell secured to said shaft having a chamber therein and a closed passage, both ends of which enter said chamber, said chamber and passage being filled with fluid, a driven shaft, a rotor secured to said shaft and mounted to rotate within said chamber, and means whereby relative rotation between said shell and rotor causes flow of fluid through said passage.

10. In a transmission mechanism, a drive shaft, a shell secured to said shaft having a chamber therein and a closed passage both ends of which enter said chamber, said chamber and passage being filled with fluid, a driven shaft, a rotor secured to said shaft and mounted to rotate within said chamber, and means whereby rotation of said shell with respect to said rotor causes flow of fluid through said passage.

11. In a transmission mechanism, a drive shaft, a shell secured to said shaft having a chamber therein and a closed passage both ends of which enter said chamber, said chamber and passage being filled with fluid, a driven shaft, a rotor secured to said shaft and mounted to rotate within said chamber, and means including blades on said rotor engaging the walls of said chamber, adapted upon rotation of said shell with respect to said rotor, to cause flow of fluid through said passage.

12. In a transmission mechanism, a drive shaft, a shell secured to said shaft having a chamber therein and a passage both ends of which enter said chamber, said chamber and passage being filled with fluid, a driven shaft, a rotor secured to said shaft and mounted to rotate within said chamber, and means whereby relative rotation between said shell and rotor causes flow of fluid through said passage, said passage being constructed and arranged to cause flow of fluid outwardly from said chamber in a straight line and inwardly to said chamber along an extended spiral path with reference to a fixed plane.

13. In a transmission mechanism, a drive shaft, a shell secured to said shaft having a chamber therein and a passage both ends of which enter said chamber, said chamber and passage being filled with fluid, a driven shaft, a rotor secured to said shaft and mounted to rotate within said chamber, and means whereby rotation of said shell with respect to said rotor causes flow of fluid through said passage, said passage being constructed and arranged to cause flow of fluid outwardly from said chamber in a straight line and inwardly to said chamber along an extended spiral path with reference to a fixed plane.

14. In a transmission mechanism, a drive shaft, a shell secured to said shaft having a chamber therein and a passage both ends of which enter said chamber, said chamber and passage being filled with fluid, a driven shaft, a rotor secured to said shaft and mounted to rotate within said chamber, and means including blades on said rotor engaging the walls of said chamber, adapted upon rotation of said shell with respect to said rotor, to cause flow of fluid through said passage, said passage being constructed and arranged to cause flow of fluid outwardly from said chamber in a straight line and inwardly to said chamber along an extended spiral path with reference to a fixed plane.

15. In a transmission mechanism, a drive shaft, a shell secured to said shaft having a chamber therein and a passage both ends of which enter said chamber, said chamber and passage being filled with fluid, a driven shaft, a rotor secured to said shaft and mounted to rotate within said chamber, and means to force fluid through said passage upon rotation of said shell with respect to said rotor, said passage being so constructed that fluid forced from said chamber travels along a radial line, and returns to said chamber along a spiral path with reference to a fixed plane.

16. In a transmission mechanism, a drive shaft, a shell secured to said shaft having a chamber therein and a passage both ends of which enter said chamber, said chamber and passage being filled with fluid, a driven shaft, a rotor secured to said shaft and mounted to rotate within said chamber, and blades on said rotor adapted to force fluid through said passage upon rotation of said shell with respect to said rotor, said passage being so constructed that fluid forced from said chamber travels along a radial line, and returns to said chamber along a spiral path with reference to a fixed plane.

In testimony whereof, I have signed my name to this specification this second day of November, 1926.

PORTER S. MORGAN.